US008264803B2

(12) United States Patent
Willieme et al.

(10) Patent No.: US 8,264,803 B2
(45) Date of Patent: Sep. 11, 2012

(54) ALTERNATOR CIRCUIT-BREAKER WITH AN INSERTED RESISTANCE

(75) Inventors: Jean-Marc Willieme, La Mulatiere (FR); Francois Biquez, Brignais (FR); Denis Frigiere, Decines (FR)

(73) Assignee: Areva T&D SA, Paris la Defense Cedex (FR)

( * ) Notice: Subject to any disclaimer, the term of this patent is extended or adjusted under 35 U.S.C. 154(b) by 521 days.

(21) Appl. No.: 12/161,316

(22) PCT Filed: Jan. 15, 2007

(86) PCT No.: PCT/EP2007/050329

§ 371 (c)(1),
(2), (4) Date: Jul. 17, 2008

(87) PCT Pub. No.: WO2007/082858

PCT Pub. Date: Jul. 26, 2007

(65) Prior Publication Data

US 2010/0220418 A1 Sep. 2, 2010

(30) Foreign Application Priority Data

Jan. 17, 2006 (FR) ...................................... 06 50155

(51) Int. Cl.
*H02H 7/06* (2006.01)
*H02H 7/00* (2006.01)

(52) U.S. Cl. ................................... 361/20; 361/2; 361/3

(58) Field of Classification Search .................. 361/2, 3, 361/20
See application file for complete search history.

(56) References Cited

U.S. PATENT DOCUMENTS

| | | | | |
|---|---|---|---|---|
| 3,590,186 | A | 6/1971 | Brunner | |
| 3,970,809 | A * | 7/1976 | Mitchell | 218/5 |
| 4,419,552 | A | 12/1983 | Haginomori | |
| 4,617,435 | A | 10/1986 | Kawasaki | |
| 5,091,614 | A * | 2/1992 | Yamamoto et al. | 218/143 |
| 5,109,145 | A * | 4/1992 | Fujita et al. | 218/130 |
| 6,751,078 | B1 * | 6/2004 | Munakata et al. | 361/58 |

FOREIGN PATENT DOCUMENTS

| | | | |
|---|---|---|---|
| CH | 440413 | A | 7/1967 |
| EP | 1117114 | A2 | 7/2001 |

OTHER PUBLICATIONS

Standard CE156 1987 "Normal values of assigned voltages of the line for on-line close defects".

Baltensperger, P., "Switching overvoltage in HV and EHV networks", CIGRE 1970 13.14, p. 9, paragraph 5.2.2. (not translated).

International Search Report, PCT/EP2007/050329, dated Mar. 21, 2007.

French Preliminary Search Report, FR 0650155, dated Oct. 18, 2006.

* cited by examiner

*Primary Examiner* — Jared Fureman
*Assistant Examiner* — Scott Bauer
(74) *Attorney, Agent, or Firm* — Nixon Peabody LLP

(57) ABSTRACT

An alternator disconnector circuit-breaker of the invention presents a resistance (30) in series with the circuit-breaker switch (20'); the resistance (30) is of fixed ohmic value that is about $10^4$ times greater than the value of the resistance of the main circuit of the circuit-breaker. By means of this configuration, it is possible to use a vacuum chamber as the circuit-breaker switch (20'), and to dimension the main switch (10), which, de facto, breaks the current even for very high short-circuit currents, under more advantageous conditions.

12 Claims, 2 Drawing Sheets

ALTERNATOR CIRCUIT-BREAKER WITH AN INSERTED RESISTANCE

CROSS REFERENCE TO RELATED APPLICATIONS OR PRIORITY CLAIM

This application is a national phase of International Application No. PCT/EP2007/050329, entitled "AN ALTERNATOR CIRCUIT-BREAKER WITH AN INSERTED RESISTANCE", which was filed on Jan. 15, 2007, and which claims priority of French Patent Application No. 06 50155, filed Jan. 17, 2006.

TECHNICAL FIELD

The invention relates to the field of electrical switchgear equipping devices for removing energy from alternators in power stations. The invention relates to inserting a resistance in order to increase performance in breaking short-circuit current.

More particularly, the invention relates to an alternator circuit-breaker comprising a main-circuit first switch put in parallel with a circuit-breaker auxiliary second switch associated with a resistance of fixed value.

STATE OF THE PRIOR ART

At the outlet of the power station, e.g. for each alternator, one safety option is to dispose a circuit-breaker making it possible to isolate the circuit in question before the transformer connected to a power line. That type of switchgear, under a voltage of in the range approximately 15 kilovolts (kV) to approximately 36 kV, then performs the functions of passing high permanent current (of the order of a few thousand amps) and of breaking high fault current (of the order of a few tens of thousands of amps), while isolating the circuit.

In view of the magnitude of the rated nominal current in the circuit, the circuit-breaking is performed in two stages by means of two switches in parallel, one of which passes the rated permanent current and the other of which breaks the short-circuit current. Although their principle is, a priori, similar to the principle of other circuit-breakers, and in particular to the principle of high-voltage and very high voltage hybrid circuit-breakers, alternator switch devices are thus subjected to power stresses that make it impossible to apply the same designs, as regards the arrangement and actuation of the various elements.

The contacts of the switch of the main circuit for such alternator circuit-breakers are heavy enough to withstand high rated currents without overheating, and they define a relatively large volume. The circuit-breaker switch conventionally comprises a small-size chamber disposed inside said volume and having arcing contacts that are mounted to move relative to each other and that, de facto, withstand only the circuit-breaking current of the circuit-breaker.

Usually, the contacts of the two switches extend in the same longitudinal direction and are moved in translation parallel to said direction; firstly the main contacts move apart and travel sufficiently before the current switches over to the arcing contacts, which then open and cause the current to be broken.

However, it appears that currents flowing through alternator circuit-breakers can be of magnitude such that the dimensioning of the switches becomes problematic. In particular, the short-circuit currents can be as high as several hundred kiloamps, which considerably increases the cost of the associated circuit-breaking chamber.

It is known that to limit overvoltages on HV networks, it is possible to use terminating resistors of which the value is on the order of magnitude of the wave impedance of the circuit, or characteristic impedance (for example, a value of 450 Ohms according to table V on page 58 of standard CEI56 1987; see also CIGRE 1970 article 13.14 "Switching overvoltage in HV and EHV networks" by Baltensperger and Ruoss, page 9, paragraph 5.2.2: "the optimal ohmic value is between half and double the characteristic impedance of the line").

It is known from U.S. Pat. No. 4,419,552 to insert a resistance of high value, typically 500 Ohms, in a secondary switch of a circuit breaker so as to limit the switching overvoltages of a high-voltage network, typically on the order of 1000 kV.

SUMMARY OF THE INVENTION

An object of the invention is to mitigate the above drawbacks by providing alternator circuit-breakers in which the short-circuit current breaking performance is increased and for which it is not necessary to develop a special circuit-breaking chamber that is compatible with such high currents. This objective is achieved by inserting a resistance by means of an auxiliary switch, in which the resistance value is much higher than that of the switch but is limited in order to reduce the speed of recovery voltage after an interruption.

More particularly, in one of its aspects, the invention provides an alternator disconnector circuit-breaker comprising a main switch which can, in particular, itself be composed of a circuit-breaker, in parallel with a circuit-breaker auxiliary circuit, comprising, for example, a vacuum chamber, each switch being associated with control means. The circuit-breaker further comprises synchronization means preferably associated with control means and making it possible, while breaking, to separate the contacts successively and in the following order: the contacts of the main first switch, then the contacts of the auxiliary second switch. Preferably, the same control means include said synchronization means and make it possible, with single control means, to implement each of the elements successively.

In the invention, in order for it to be capable of withstanding very high short-circuit currents without being over-dimensioned, the circuit-breaker of the invention further comprises a resistance of fixed value that is inserted into the auxiliary circuit, and that is put in series with the second switch. The value of the resistance can advantageously be higher by an order of about 10,000 times or even 10,000,000 times than the resistance of the main first switch, e.g. in the range 0.1Ω to 40Ω, and advantageously between 0.1 and 10Ω.

Advantageously synchronization means make it possible, during closing, to put the contacts of the first switch in contact before putting the contacts of the second switch in contact.

BRIEF DESCRIPTION OF THE DRAWINGS

The characteristics and advantages of the invention will be better understood on reading the following description with reference to the accompanying drawings, which are given by way of non-limiting illustration.

DETAILED DESCRIPTION OF PARTICULAR EMBODIMENTS

Figure 1A:
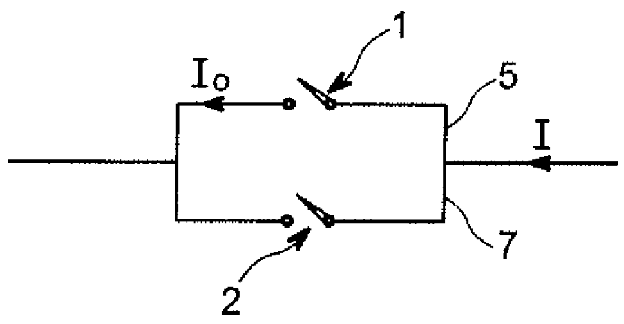
FIG. 1 diagrammatically shows the circuit-breaking principle of a conventional alternator circuit-breaker (FIG. 1A) according to the invention (FIGS. 1B and 1C).

For a circuit-breaker that is disposed at the outlet of the alternator, that is subjected to operating conditions that are very different from the operating conditions of a high-voltage line circuit-breaker, and whose principle is shown diagrammatically in FIG. 1A, conventionally, passing a current I of rated magnitude greater than several thousand amps requires a switch 1 whose contacts are particularly conductive, e.g. made of copper, to be used on the main circuit; the circuit-breaking power of those contacts, i.e. their power to break a short-circuit current $I_{SC}$ is however, limited due to electric arcs striking. A circuit-breaker second switch 2 is put in parallel with the first switch 1 in order to perform the function of breaking the short-circuit current $I_{SC}$, the first switch 1 opening causing, de facto, the rated current 5 to be switched over to the circuit-breaker circuit 7; the contacts of said second switch 2 that are, for example, made of tungsten, are of limited performance as regards passing the rated current I, but have high breaking power.

Thus, the functions of passing the permanent current I and of breaking short-circuit current $I_{SC}$ are separated: when such breaking is necessary, firstly the first switch 1 is activated, all of the current I then going over to the auxiliary circuit 7 and causing the second switch 2 to be opened so as to obtain the breaking function.

However, it appears that that type of circuit-breaker is costly and complex to develop and to manufacture for extremely high currents, in particular for breaking currents higher than several hundred kiloamps.

One way of reducing the costs of developing such circuit-breakers is to associate known switchgear with elements that make it easier to break high short-circuit currents. For example, Document EP 1 117 114 proposes to insert an arc generator device in order to facilitate the action of the circuit-breaker second switch, but that makes the circuit-breaker more voluminous and more expensive.

Figure 1B:
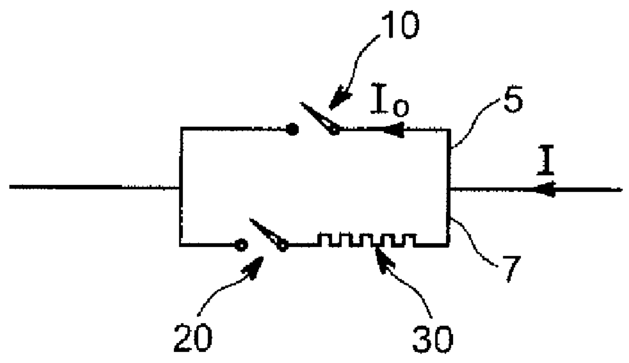

In the invention, a different circuit-breaking principle, shown in FIG. 1B, is considered as being preferable: two switches 10, 20 are put in parallel on the main circuit 5 and on an auxiliary circuit 7, each of the switches having at least one pair of contacts that are mounted to move relative to each other. When circuit-breaking is necessary, the main switch 10 opening makes it possible for the current $I_{SC}$ to be broken effectively under conditions made favorable by the presence of a resistance placed at its terminals, the auxiliary switch 20 making final breaking possible.

For this purpose and others, a resistance 30 of determined value R is placed on the auxiliary circuit 7, in series with the switch 20. This insertion resistor 30 guarantees that a negligible current $I_r=I-I_0$ flows through the auxiliary branch 7, even when the current is a circuit-breaking current. The value R of the resistance 30 is thus chosen to be considerably higher than the value of the resistance of the main switch 10, or even of the main circuit 5, e.g. $10^4$ or $10^5$ to $10^7$ times higher; in particular, a switch 10 used for this type of alternator circuit-breaker conventionally has a resistance of the order of a few millionths of an ohm (Ω) to a few tens of millionths of an ohm, and the resistance 30 used is of the order of one tenth of an ohm to about ten ohms, for example 40 Ohms, advantageously R=1Ω.

By means of the presence of this constant auxiliary resistance 30 with a value of between 0.1 and 40 Ohms, the speed of increase in the re-strike voltage across the terminals of the switch 10 is reduced. It is significantly reduced with a value of between 0.1 and 10 Ohms. In the absence of the resistance insertion circuit 7, the switch 10 opening and the current being broken give rise to a very high speed of increase in the re-strike voltage indicated by standards, e.g. in the range 4 kilovolts per microsecond (kV/μs) to 6 kV/μs. The presence of the additional resistance 30 makes it possible to reduce the speed of increase in the re-strike voltage considerably, typically to in the range 0.01 kV/μs to 1 kV/μs, and thus facilitates breaking the current by delaying the increase in the voltage across the terminals of the switch 10. Thus, the circuit-breaking function can be performed in a first stage and in less costly manner by the switch 10 of the main circuit 5.

Following opening of the first switch 10, e.g. by action of a control mechanism causing its contacts to separate, the auxiliary second switch 20 is caused to open, preferably by the same control means, in order to break the current finally. In the invention, the resistive current $I_r$ established in the auxiliary branch 7 of the circuit is considerably lower than the current $I_0$ flowing in the main circuit 5, which is almost identical to the rated current I or to the short-circuit current $I_{SC}$. By means of the presence of the resistance 30, the circuit-breaker switch 20 can be dimensioned appropriately, and in particular for a lower current, for a low current $I_r$ that is considerably lower than $I_{SC}$.

Figure 1C:
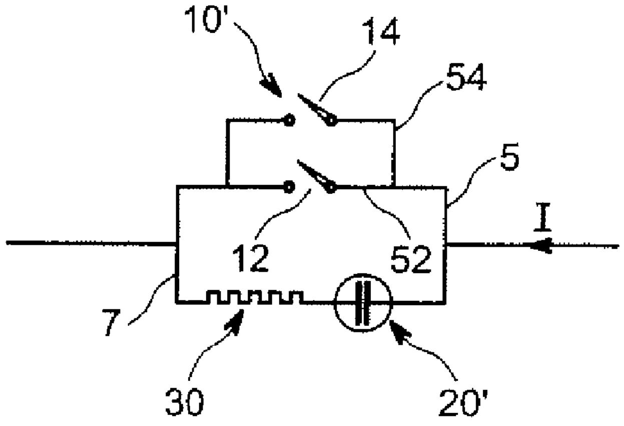

The auxiliary switch 20 can be a gas-insulated circuit-breaking chamber, but, in particular, it becomes possible, by means of the invention, to use a vacuum chamber 20' (shown diagrammatically in FIGS. 1C) although the magnitude of the short-circuit current would, a priori, suggest dimensioning that is too costly, or even impossible, of this type of switch device for a conventional circuit-breaker.

In addition, insertion of the resistance 30 makes much easier dimensioning of the main circuit-breaking chamber 10 possible. Adjusting the value R of the resistance 30 makes it possible to optimize the main chamber 10/auxiliary chamber 20 pair: if R decreases, the first switch 10 is stressed less and the second switch 20 is stressed more, and vice versa.

The main switch 10 can also be a gas-insulated circuit-breaking chamber containing a gas of the sulfur hexafluoride ($SF_6$) type. Advantageously, in a preferred embodiment shown diagrammatically in FIG. 1C and, in view of the magnitudes of the currents $I_0$ passing through it, the first switch 10' itself consists of a circuit-breaker comprising two switches 12, 14 in parallel on two branches $\mathbf{5}_2$, $\mathbf{5}_4$ of the main circuit 5.

Figure 2:
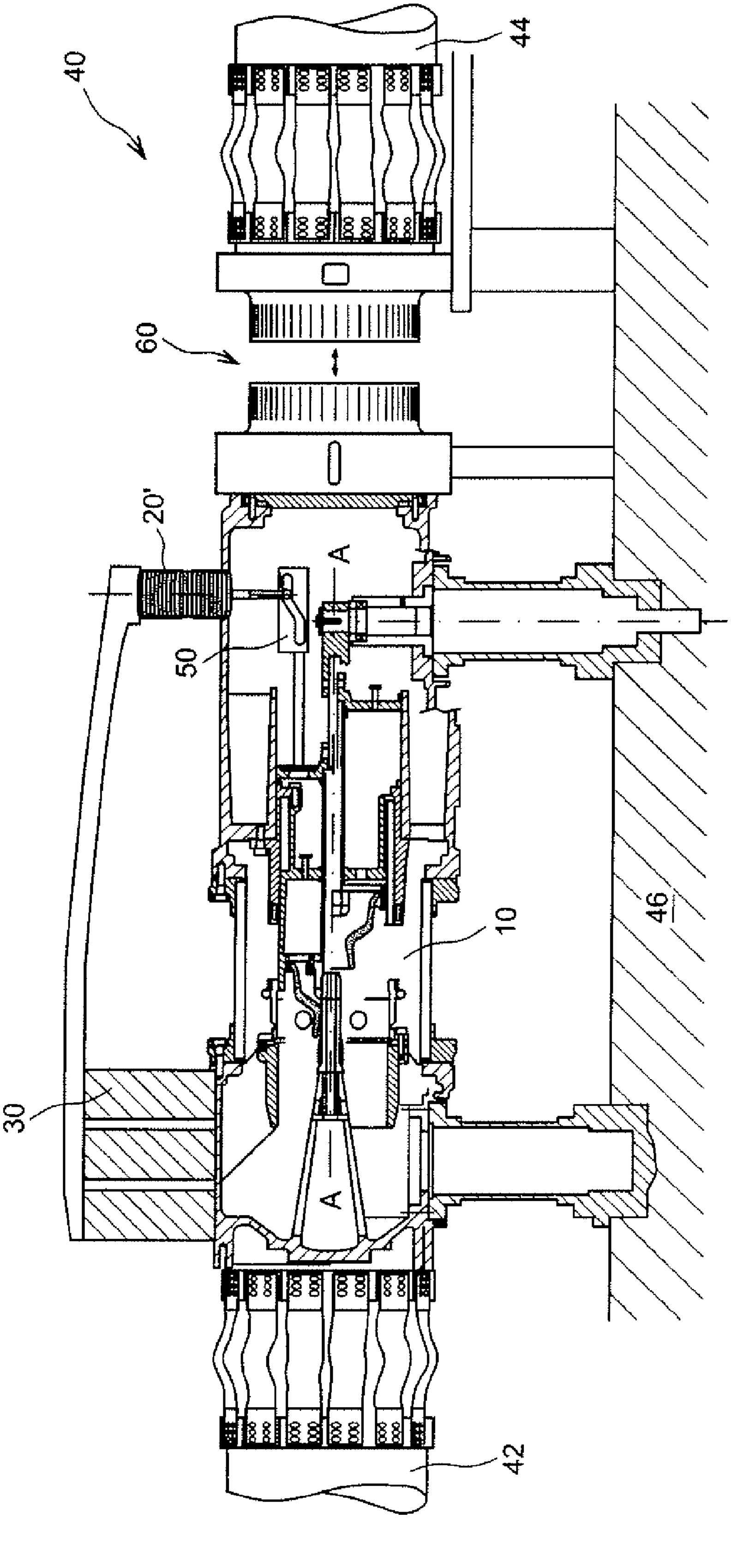
FIG. 2 shows a preferred embodiment of the circuit-breaker of the invention.

A practical embodiment is, for example, shown merely by way of indication and diagrammatically in FIG. 2, in which the top portion shows the circuit-breaker 40 closed, and the bottom portion shows the current passing through the omnibus-bars 42, 44 broken. The circuit-breaker 40 is advantageously secured to the floor 46 in stationary manner, between a power station alternator coupled to the first set of bus-bars 42 and a high-voltage transformer coupled to the second set of bus-bars 44.

It is advantageous, as shown, for reasons of compactness, to dispose the vacuum chamber 20' at an angle of 90° relative to the main switch 10; the synchronization means 50 can, for example comprise a rod mounted to slide via its end in a sloping slot making it possible to delay opening. The configuration shown, in which the vacuum chamber 20' is above the pole of the circuit-breaker 40, can naturally be replaced by an auxiliary switch 20 situated on a horizontal plane at the axis AA of the first switch 10, or any other plane by rotating the chamber about said axis AA. Similarly, the resistances 30 can be situated anywhere in the circuit-breaker 40 where space is available.

The circuit-breaker of the invention can further comprise a third switch 60 in series with the second switch 20, for disconnection purposes rather than for breaking purposes, in order to avoid a reduction in the dielectric strength of the second switch 20 which could accidentally enable current to flow through the associated branch 7.

A person skilled in the art will advantageously make sure to insert the resistance according to the invention, with a value of between 0.1 and 40 Ohms, only when there is an interruption. Indeed, in the case of an alternator disconnector circuit-breaker, the insertion of the resistance upon closing would lead to an over-sizing thereof because it would create significant heating of the resistance in a combined closing/opening switching operation.

The invention claimed is:

1. An alternator disconnector circuit-breaker comprising:

a main first switch having a first pair of contacts that are mounted to move relative to each other in translation along a first axis, the main switch comprising an interrupting chamber of a gas-insulating circuit-breaker;

a short-circuit auxiliary second switch having a second pair of contacts that are mounted to move relative to each other, the second switch being put in parallel with the first switch; the second switch being associated in series with a resistor of set value; and synchronization means making it possible, while breaking, for the contacts of the first switch to separate before the contacts of the second switch separate;

wherein the resistance of the first switch (10) is on the order of $10^{-6}$ to $10^{-4}$ Ω, and the associated resistance is on the order of 0.1 to 40 Ω.

2. An alternator disconnector circuit-breaker according to claim 1, in which the associated resistance is on the order of 0.1 to 10 Ω.

3. An alternator disconnector circuit-breaker according to claim 1 in which synchronization means make it possible, during closing, to put the contacts of the first switch in contact before putting the contacts of the second switch in contact.

4. An alternator disconnector circuit-breaker according to claim 1, in which the second switch is a vacuum chamber.

5. A circuit-breaker according to claim 1, further comprising a third switch in series with the second switch, and in which the synchronization means are adapted to separate the pair of contacts of the second switch before the pair of contacts of the third switch are caused to separate.

6. A circuit-breaker according to 1, in which the first switch is a circuit-breaker comprising two switches in parallel.

7. An alternator disconnector circuit-breaker comprising:

a main first switch having a first pair of contacts that are mounted to move relative to each other in translation along a first axis, the main switch comprising an interrupting chamber of a gas-insulating circuit-breaker;

a short-circuit auxiliary second switch having a second pair of contacts that are mounted to move relative to each other, the second switch being put in parallel with the first switch; the second switch being associated in series with a resistor of set value; and synchronization means making it possible, while breaking, for the contacts of the first switch to separate before contacts of the second switch;

wherein the resistance of the first switch is on the order of $10^{-6}$ to $10^{-4}$Ω, and the associated resistance is on the order of $10^4$ to $10^5$ times the resistance of the first switch.

8. An alternator disconnector circuit-breaker according to claim 7, in which the associated resistance is on the order of 0.1 to 10 Ω.

9. An alternator disconnector circuit-breaker according to claim 7 in which synchronization means make it possible, during closing, to put the contacts of the first switch in contact before putting the contacts of the second switch in contact.

10. An alternator disconnector circuit-breaker according to claim 7, in which the second switch is a vacuum chamber.

11. A circuit-breaker according to claim 7, further comprising a third switch in series with the second switch, and in which the synchronization means are adapted to separate the pair of contacts of the second switch before the pair of contacts of the third switch are caused to separate.

12. A circuit-breaker according to claim 7, in which the first switch is a circuit-breaker comprising two switches in parallel.

* * * * *